United States Patent [19]

Nathanson

[11] Patent Number: 4,650,573

[45] Date of Patent: Mar. 17, 1987

[54] OZONE GENERATOR WATER TREATMENT

[76] Inventor: Roger T. Nathanson, 2124 Shawnee St., Sarasota, Fla. 33581

[21] Appl. No.: 691,058

[22] Filed: Jan. 14, 1985

[51] Int. Cl.$^4$ .............................................. C02F 1/78
[52] U.S. Cl. ................................... 210/136; 210/192; 204/302; 422/186.09
[58] Field of Search ............... 210/760, 192, 243, 136, 210/205; 55/29, 387; 204/176, 302, 308; 422/186.09

[56] References Cited

U.S. PATENT DOCUMENTS

| | | | |
|---|---|---|---|
| 2,850,641 | 9/1958 | Martin, Jr. | 250/44 |
| 3,421,999 | 1/1969 | Corwin | 210/192 X |
| 3,699,776 | 10/1972 | La Raus | 210/192 X |
| 3,823,728 | 7/1974 | Burris | 210/760 X |
| 3,997,631 | 12/1976 | Matsuoka et al. | 210/192 X |
| 4,043,913 | 8/1977 | Hintermeister | 210/192 X |
| 4,049,552 | 9/1977 | Arff | 210/192 |
| 4,090,960 | 5/1978 | Cooper | 210/192 X |
| 4,176,061 | 11/1979 | Stopka | 210/63 Z |
| 4,412,924 | 11/1983 | Feather | 210/744 |
| 4,427,426 | 1/1984 | Johnson et al. | 210/192 X |

Primary Examiner—Tom Wyse
Attorney, Agent, or Firm—Charles J. Prescott; Raymond H. Quist

[57] ABSTRACT

An ozone generator has a central metal bristle brush electrode with a metal cylindrical electrode separated from it by a Pyrex cylinder. The electrodes are contained in a sealed cylinder having an inlet for air at one end and an outlet for ozone containing gas at the other end. A transformer connected to the electrodes provides a voltage high enough to create an ionizing electric field between the electrodes. Ozone generation is initiated in response to a demand for treated water which occurs in one embodiment when a well pump turns on, and in another embodiment when a faucet is turned on. A compressor is used in conjunction with the well pump, and an aspirator is used in conjunction with the faucet.

17 Claims, 3 Drawing Figures 4,650,573

1

OZONE GENERATOR WATER TREATMENT

BACKGROUND OF THE INVENTION

1. Field of the Invention

This invention relates generally to water purification systems, and more particularly to the purification of water with ozone.

Untreated water pumped from household wells, even when potable, often contains sediment and other odor and color causing materials which degrade its usefulness. In addition, water received from public systems may have residual tastes or smells which make it unappetizing.

Ozone has been used to solve these problems in municipal water systems successfully; however, the inventor is not aware of any practical application of ozone treatment on a smaller scale such as a domestic or other small system.

2. Description of the Prior Art

U.S. Pat. No. 2,850,641, Martin, Jr., entitled "Apparatus for Generating Ions in the Atmosphere", discloses a system for producing ions in the atmosphere of a room employing concentric, cylindrical electrodes.

U.S. Pat. No. 4,049,552, Arff, entitled "Ozone Generating System", describes an ozone generator employing a plurality of sealed glass tubes designed to have a high voltage on the inner surface. The tubes are contained in a metal housing which is the other electrode. Air is passed through the housing to produce ozone.

U.S. Pat. No. 4,176,061, Stopka, entitled "Apparatus and Method for Treatment of Fluid with Ozone", aspirates ozone into the water and passes the mixture through a long conduit to allow time for the ozone to dissolve.

U.S. Pat. No. 4,412,924, Feather, entitled "Water Purification System", uses two tanks, one with raw water and the other with treated water. The raw water is treated with air and the treated water receives ozone.

SUMMARY OF THE INVENTION

An ozone generator is automatically started when water is flowing either in response to the actuation of a pump or by water flow directly through the use of an aspirator. The ozone generator is a corona type having a metal brush as one electrode and a cylindrical sheet metal element surrounding the brush as the other electrode. A Pyrex glass cylinder separates the electrodes. In the arrangement used with a water pump, an air compressor permits injection of the ozone into the water.

DESCRIPTION OF THE PREFERRED EMBODIMENTS

Figure 1:
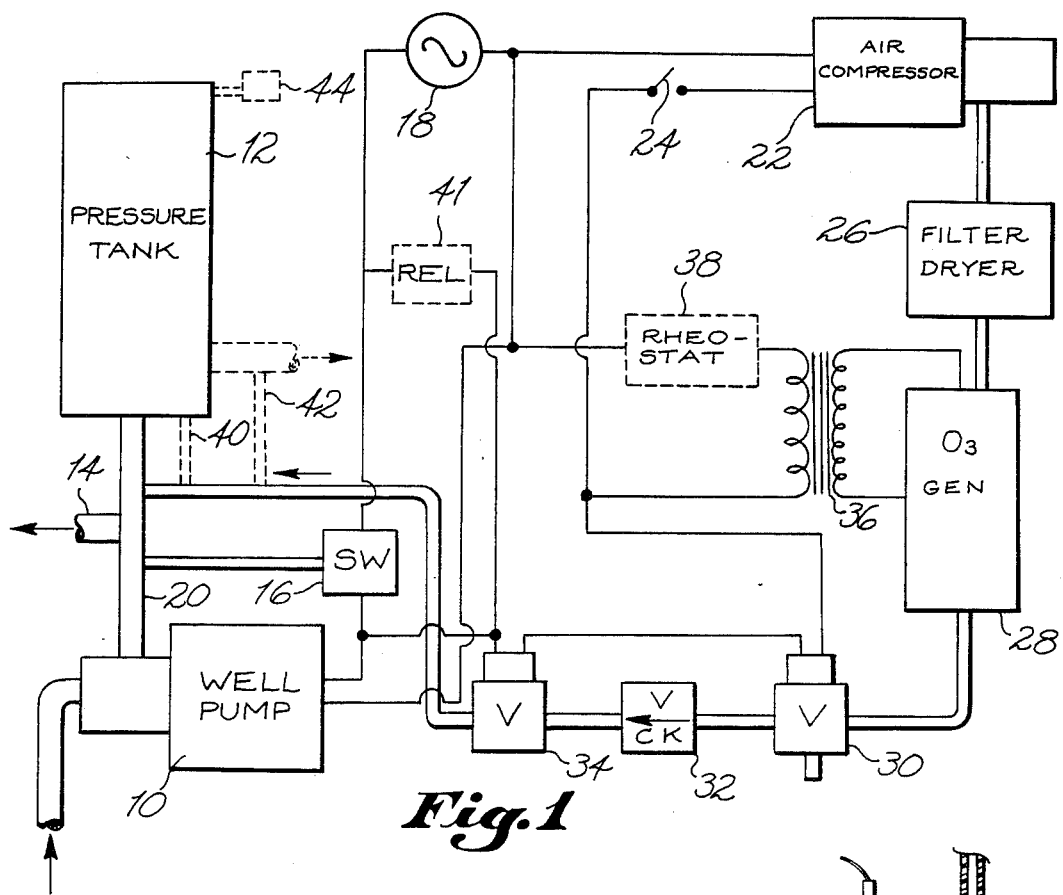
FIG. 1 is a schematic of the invention used in conjunction with a well pump.

Referring to FIG. 1, well pump 10 is of the typical domestic type which supplies well water to pressure tank 12 and supply line 14 when switch 16 closes the circuit to power supply 18. Switch 16 closes when the water pressure in the discharge line 20 falls below a preset limit. Although switch 16 is here located in discharge line 20, it may be located elsewhere, such as in pressure tank 12. It will be recognized that the foregoing system may already be in place and does not constitute the present invention.

In accordance with the invention, the motor of air compressor 22 is also connected to power supply 18, with one leg of this electrical connection in series with switch 16. Switch 24, which is normally left in the closed position, is provided so that the ozone generator may be inactivated while not interfering with normal operation of well pump 10. Air compressor 22, in the system built, is a 1/12 HP, diaphragm type, produced by Gast Manufacturing Co.

The compressed air produced by air compressor 22 is conveyed through filter/dryer 26 to ozone generator 28. Filter/dryer 26 has a porous ceramic element through which the compressed air flows. A suitable filter/dryer is produced by C. A. Norgren Co. and described as a ¼ inch by ¼ inch.

The ozone containing gas which is discharged from ozone generator 28 is conveyed through solenoid valve 30, check valve 32 and solenoid valve 34 to be supplied to the water to be treated. Solenoid valves 30 and 34 have their solenoids connected in series with switches 16 and 24 so that when both these switches are closed the gas will pass through the valves. When either switch 16 or 24 is open, solenoid valve 34 will close the passage through it and solenoid valve 30 will vent to the atmosphere the conduit and components back to compressor 22. This permits compressor 22 to be started without a high back pressure. Both solenoid valves are available commercially, for example from Richdel Manufacturing Co.

Transformer 36 will transform the 110 volt power supply provided to its primary coil to a 10,000 volt output on its secondary coil. This secondary voltage is supplied to ozone generator 28. It has been found empirically that a sufficient quantity of ozone is achieved in some systems when the voltage supplied to ozone generator 28 is less than 10,000 volts. This lower voltage may be obtained by using optional rheostat 38 in the primary circuit of transformer 36. A dimmer switch such as those made by Leviton Co. will serve as optional rheostat 38.

The ozone produced may be injected in pump discharge line 20 as shown, or may alternatively be supplied directly to pressure tank 12 through line 40 or to the tank discharge line through line 42 (in those cases where the discharge is from pressure tank 12). Optional relay 41 may be used to provide a time-delay during which ozone will continue to be supplied to pressure tank 12 after pump switch 16 opens.

When ozone is supplied to pump discharge line 20 or directly to pressure tank 12, it is necessary that pressure tank 12 be equipped with automatic air vent 44 to bleed excess gas from the tank.

Figure 2:
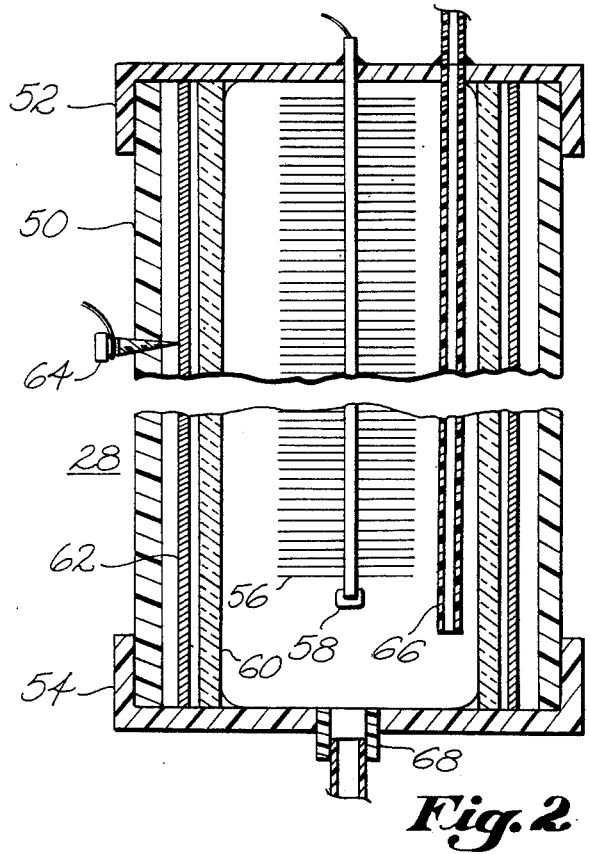
FIG. 2 is a cross-section of the ozone generator used in the invention.

Turning next to FIG. 2, the ozone generator 28 of FIG. 1 will be described. Side wall 50, which may be a polyvinyl chloride pipe section, together with end caps 52 and 54 of the same material form the body of ozone generator 28. Wire brush electrode 56 is sealingly mounted in one end cap 52 so that it will be generally centrally located within ozone generator 28. The wire brush electrode which has been used is stainless steel and has a 1.27 cm diameter although the dimensions are not critical. Stainless steel has been used because it is readily available and resists corrosion. Plastic end cap 58 has been provided on the tip of the rod of brush electrode 56 since this point is particularly vunerable to electrolytic corrosion.

Surrounding brush electrode 56, but spaced from it, is an electrically insulating wall 60. A 45 mm Pyrex cylinder has been found suitable for this purpose. Wall 60 is sealed to end caps 52 and 54 with ozone resistant caulking.

In the space between side wall 50 and insulating wall 60 is positioned electrode 62. A sheet of galvanized metal has been used for electrode 62; however, aluminum or copper would also be suitable. In addition, forming a conductor on the outer surface of wall 60 should work. An electrical connection to electrode 62 has been conveniently made using a self tapping screw 64.

Air is delivered into ozone generator 28 through end cap 52 by plastic tube 66. Tube 66 extends past brush electrode 56 so that any residual liquid moisture will tend to pass into outlet 68 located in end cap 54. In some cases when ambient air rather than compressed air is supplied to ozone generator 28 tube 66 may be omitted.

Ozone generator 28 will convert a portion of the oxygen in the air supplied to it to ozone when an ionizing electric field is produced between brush electrode 56 and electrode 62. It has been found that further ozone will be produced when one or two additional ozone generators are placed in series; however, additional ozone generators beyond these will produce little if any additional ozone unless a larger compressor is employed.

Figure 3:
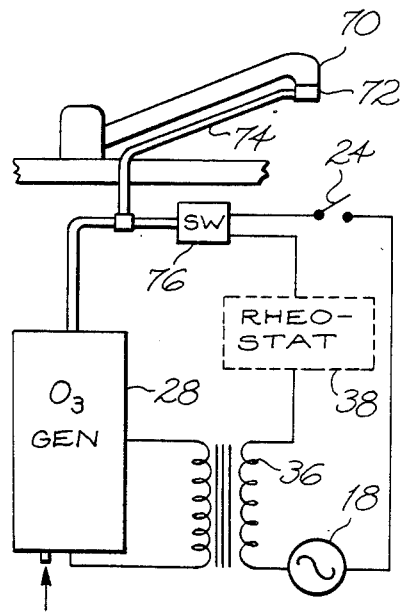
FIG. 3 is a schematic of another embodiment of the invention.

In FIG. 3 another embodiment of the invention is shown. Nozzle 70 of a faucet has screwed onto its end threads, aspirator 72 which is connected by tubing 74 to ozone generator 28 and vacuum switch 76. The latter parts and the rest of the system may conveniently be located below the sink. Vacuum switch 76 closes when water flows through nozzle 70 and aspirator 72 in response to the opening of the faucet. This completes the circuit to transformer 36 from power supply 18. As in the FIG. 1 embodiment, rheostat 38 may optionally be used to reduce the voltage applied across the electrodes of ozone generator 28. In the FIG. 3 embodiment no compressor is used as the aspirator 72 will draw air into the ozone generator 28 and the ozone containing gas into the water flowing through aspirator 72.

Although ozone generator water treatment systems in accordance with the invention have been illustrated and described, it will be evident that changes and modifications can be made without departing from the spirit of the invention and the scope of the appended claims.

I claim:

1. An ozone generator water treatment system comprising:
   an ozone generator having an inlet for admitting air and an outlet for discharging ozone containing gas;
   means for creating a pressure differential between said inlet and said outlet whereby air will be induced to flow into said inlet;
   a wire brush electrode positioned between said inlet and said outlet;
   a second electrode at least partially surrounding said wire brush electrode;
   electrical insulating means separating said wire brush electrode and said second electrode; and
   means for conveying said ozone containing gas to the water to be treated.

2. An ozone generator water treatment system in accordance with claim 1 further comprising:
   switch means responsive to a demand for treated water for initiating the generation of ozone by said ozone generator whereby ozone will only be generated when needed.

3. An ozone generator water treatment system in accordance with claim 1 further comprising:
   electric potential supply means connected to said brush and second electrodes for producing an ionizing electric field therebetween.

4. An ozone generator water treatment system in accordance with claim 1 wherein:
   said means for creating a pressure differential between said inlet and said outlet is an air compressor.

5. An ozone generator water treatment system in accordance with claim 1 wherein:
   said means for creating a pressure differential between said inlet and said outlet is an aspirator.

6. An ozone generator water treatment system in accordance with claim 1 wherein said electrical insulating means separating said wire brush electrode and said second electrode is a Pyrex cylinder.

7. An ozone generator water treatment system comprising:
   a cylindrical chamber fabricated of electrically insulating material;
   a first electrode positioned within said chamber;
   said first electrode having a central core with a multiplicity of stainless steel bristles radiating therefrom;
   a Pyrex cylinder surrounding said first electrode;
   a second electrode separated from said first electrode by said Pyrex cylinder;
   said second electrode being a sheet of galvanized metal;
   a first end cap sealing one end of said chamber and having an inlet therein for admitting air;
   a second end cap sealing the other end of said chamber and having an outlet therein for discharging ozone containing gas;
   means for creating a pressure differential between said inlet and said outlet whereby air will be induced to flow into said inlet;
   electric potential supply means connected to said first and second electrodes for producing an ionizing electric field therebetween;
   switch means responsive to a demand for treated water for initiating the generation of ozone by said ozone generator whereby ozone will only be generated when needed; and
   means for conveying said ozone containing gas to the water to be treated.

8. An ozone generator water treatment system in accordance with claim 7 wherein:
   said means for creating a pressure differential between said inlet and said outlet is an air compressor.

9. An ozone generator water treatment system in accordance with claim 8 further including:
   a first solenoid operated valve positioned between said outlet of said ozone generator and said means for conveying said ozone containing gas to the water to be treated having a first position in which said outlet is connected to said means for conveying said ozone containing gas to the water to be treated and a second position in which said outlet is connected to the atmosphere.

10. An ozone generator water treatment system in accordance with claim 9 further including:
a check valve positioned between said first solenoid operated valve and said means for conveying said ozone containing gas to the water to be treated.

11. An ozone generator water treatment system in accordance with claim 10 further including:
a second solenoid operated valve positioned between said check valve and said means for conveying said ozone containing gas to the water to be treated having a first position in which said check valve is connected to said means for conveying said ozone containing gas to the water to be treated and a second position in which it is a check valve.

12. An ozone generator water treatment system in accordance with claim 10 wherein:
said electric potential supply means includes a transformer.

13. An ozone generator water treatment system in accordance with claim 12 further including:
means for reducing the potential supplied to said transformer.

14. An ozone generator water treatment system in accordance with claim 10 further including:
delay relay means bypassing said switch means for continuing the generation of ozone after said demand for treated water ceases.

15. An ozone generator water treatment system in accordance with claim 10 further including:
filter/dryer means connected between said air compressor and said ozone generator.

16. An ozone generator water treatment system in accordance with claim 7 wherein:
said means for creating a pressure differential between said inlet and said outlet is an aspirator.

17. An ozone generator water treatment system in accordance with claim 16 wherein:
said electric potential supply means includes a transformer.

* * * * *